United States Patent
Blohowiak et al.

(10) Patent No.: US 11,202,114 B2
(45) Date of Patent: *Dec. 14, 2021

(54) METHODS AND SYSTEMS FOR EFFICIENTLY DOWNLOADING MEDIA ASSETS

(71) Applicant: Rovi Guides, Inc., San Jose, CA (US)

(72) Inventors: Aaron Peter Blohowiak, Belmont, CA (US); Ryan Werth, San Francisco, CA (US); Olivier Chalouhi, Mountain View, CA (US); Ofer Vaisler, Sunnyvale, CA (US); Milan Patel, Santa Clara, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,080

(22) Filed: Apr. 5, 2021

(65) Prior Publication Data
US 2021/0227273 A1 Jul. 22, 2021

Related U.S. Application Data

(63) Continuation of application No. 15/087,214, filed on Mar. 31, 2016, now Pat. No. 10,999,614.

(51) Int. Cl.
*H04N 21/24* (2011.01)
*H04N 21/45* (2011.01)
(Continued)

(52) U.S. Cl.
CPC ..... *H04N 21/2402* (2013.01); *H04N 21/2407* (2013.01); *H04N 21/4334* (2013.01);
(Continued)

(58) Field of Classification Search
CPC ........... H04N 21/2402; H04N 21/2407; H04N 21/4334; H04N 21/44209; H04N 21/4532;
(Continued)

(56) References Cited

U.S. PATENT DOCUMENTS 8,132,200 B1 3/2012 Karam
2010/0199318 A1 8/2010 Chang et al.
(Continued)

FOREIGN PATENT DOCUMENTS

CN 108989838 A 12/2018
EP 2469773 A1 6/2012
(Continued)

OTHER PUBLICATIONS

Haakon Riiser et al., "Video streaming using a location-based bandwidth-looking up service for bitrate planning," ACM Transactions on Multimedia Computing Communications and Applications, Association for Computing Machinery, vol. 8, No. 3, pp. 1-19 (2012).

*Primary Examiner* — Nicholas T Corbo
(74) *Attorney, Agent, or Firm* — Haley Guiliano LLP

(57) ABSTRACT

Methods and systems are described for downloading media assets efficiently and quickly before loss of network connectivity. The method may allow a user to download portions of a media asset in different versions to download a maximum portion of the media asset before loss of network connectivity. Certain versions of media assets may be downloaded more quickly than other versions of media assets. The method may also allow a user to view partially downloaded media assets without network connectivity. The method may also replace portions of media assets downloaded in a first version with portions of the media assets in a second version once network connectivity is restored.

18 Claims, 12 Drawing Sheets

(51) Int. Cl.
*H04N 21/442* (2011.01)
*H04N 21/845* (2011.01)
*H04N 21/433* (2011.01)
*H04N 21/462* (2011.01)
*H04N 21/482* (2011.01)
*H04N 21/84* (2011.01)

(52) U.S. Cl.
CPC ... *H04N 21/44209* (2013.01); *H04N 21/4532* (2013.01); *H04N 21/4622* (2013.01); *H04N 21/4821* (2013.01); *H04N 21/84* (2013.01); *H04N 21/845* (2013.01); *H04N 21/8456* (2013.01)

(58) Field of Classification Search
CPC ........... H04N 21/4622; H04N 21/4821; H04N 21/84; H04N 21/845; H04N 21/8456
See application file for complete search history.

(56) References Cited

U.S. PATENT DOCUMENTS

| | | |
|---|---|---|
| 2010/0325545 A1 | 12/2010 | Bennett et al. |
| 2012/0289147 A1 | 11/2012 | Raleigh et al. |
| 2013/0326024 A1 | 12/2013 | Chen et al. |
| 2014/0040496 A1 | 2/2014 | Moorthy et al. |
| 2014/0108502 A1 | 4/2014 | Lai et al. |
| 2014/0143439 A1 | 5/2014 | Ramamurthy |
| 2015/0012928 A1 | 1/2015 | Chen et al. |
| 2015/0206542 A1 | 7/2015 | Gilson |
| 2015/0282000 A1 | 10/2015 | Andersson et al. |
| 2015/0350703 A1 | 12/2015 | Rynderman et al. |

FOREIGN PATENT DOCUMENTS

| | | |
|---|---|---|
| EP | 2897337 A1 | 7/2015 |
| JP | 2005084752 A | 3/2005 |
| KR | 20160025558 A | 3/2016 |

100
Media Assets Available for Download:
102
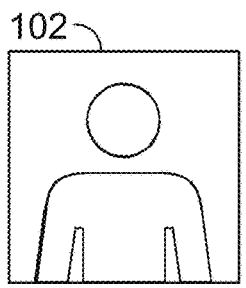
Movie A
104
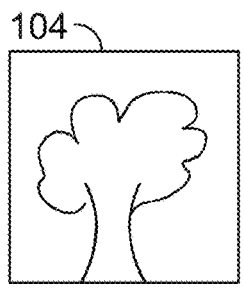
TV Show B
106
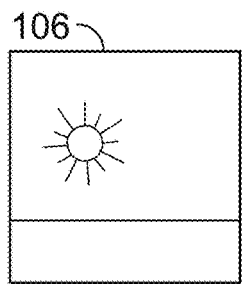
Song C
Current Device = Tablet
108
FIG. 1

1300

1302
TRANSMIT, TO THE SERVER, A REQUEST FOR A FIRST PORTION OF THE FIRST VERSION OF THE MEDIA ASSET, ASSOCIATED WITH THE FIRST VERSION IDENTIFIER, COMPRISING THE FIRST SEGMENT OF THE USER SELECTED MEDIA ASSET

1304
RECEIVE THE FIRST PORTION OF THE FIRST VERSION OF THE MEDIA ASSET FROM A SERVER

1306
STORE THE FIRST PORTION OF THE FIRST VERSION OF THE MEDIA ASSET

1308
LINK THE FIRST PORTION OF THE FIRST VERSION OF THE MEDIA ASSET TO OTHER PORTIONS OF THE MEDIA ASSET BASED ON MEDIA ASSET METADATA

FIG. 13

METHODS AND SYSTEMS FOR EFFICIENTLY DOWNLOADING MEDIA ASSETS

CROSS-REFERENCE TO RELATED APPLICATIONS

This application is a continuation of U.S. patent application Ser. No. 15/087,214, filed Mar. 31, 2016, now allowed, which is hereby incorporated by reference herein in its entirety.

BACKGROUND

Users of media guidance applications may wish to download media assets to their user devices for storage. The users may watch the stored media assets when they do not have access to a communications network. Media guidance applications do not calibrate download characteristics to allow the media assets to be quickly and fully downloaded on user devices. This causes incomplete downloads to be performed if a user device loses access to a communications network during the download. Media guidance applications do not allow users to watch media assets if the media assets have only been partially downloaded on a user device. Hence, incomplete downloads may be useless to and frustrating for users.

SUMMARY

Methods and systems for efficiently downloading media assets are described in this disclosure. In some aspects, the method includes receiving a user selection of a media asset. For example, the media guidance application may receive a user selection of "Movie A" indicating that the user wishes to download Movie A and have it locally stored on the user's device for future access. In some embodiments, the media guidance application may receive user selections of more than two media assets, and order them based on the current user device being used by the user. For example, if the media guidance application received user selections of a movie and a song on a television, the media guidance application may schedule the movie before the song in a download order for the media assets because the media guidance application may have predetermined information that states movies are accessed more frequently than songs on televisions.

The method may include determining future unavailability of a network. For example, the media guidance application may determine, based on information from a user's calendar, that the user will soon be boarding a flight and will not have network access for the duration of the flight. The media guidance application may further determine the requested media asset download of "Movie A" cannot be completed in HD quality before the user boards her flight. The media guidance application may determine future unavailability based on one of a calendar, a location, and a behavior pattern.

The method may include receiving, from a server, based on receiving the user selection, a first version identifier associated with the media asset and a second version identifier associated with the media asset, wherein the first version identifier is associated with a first version of the media asset stored on the server and the second version identifier is associated with a second version of the media asset stored on the server. For example, the media guidance application may transmit a request to a server requesting identifiers of all available versions of the requested media asset. The media guidance application may receive the following identifiers associated with different versions of the media asset "Movie A": "HD" and "SD". The version may be any of HD quality, SD quality, 4K quality, 240p quality, 320p quality, 480 quality, 720p quality, and 1080p quality.

The method may include splitting, in response to receiving the first version identifier and the second version identifier, the media asset into a first segment and a second segment. For example, the media guidance application may split the media asset "Movie A" into two segments of equal length, wherein one segment will be downloaded in SD quality and another version will be downloaded in HD quality. The size of the segments may be based on the determined future unavailability of the network. The splitting may further be based on a time remaining until the future unavailability of the network. For example, the media guidance application may split the media asset to ensure the media asset can be completely downloaded before the loss of network connectivity. The splitting may further be based on received user selections such as a maximum download time, a percentage associated with the first version of the media asset, and a desired version of the media asset.

The method may include transmitting, to the server, a request for a first portion of the first version of the media asset, associated with the first version identifier, comprising the first segment of the media asset and a second portion of the second version of the media asset, associated with the second version identifier, comprising the second segment of the media asset. For example, the media guidance application may transmit a request to a video-on-demand server requesting a first half of "Movie A" in SD quality and a second half of "Movie A" in HD quality, wherein the request comprises the received identifiers "SD" and "HD". The media guidance application may request only SD quality for the beginning and end portions of "Movie A" as these portions may only contain opening and ending credits respectively, and hence may not be of interest to the user.

The method may include receiving, from the server, prior to the determined future unavailability of the network, the first portion of the first version of the media asset and the second portion of the second version of the media asset. For example, the media guidance application may receive a first half of "Movie A" in SD quality and a second half of "Movie A" in HD quality. The media guidance application may generate for display an icon on a program listings page indicating how much of "Movie A" has been downloaded in which version. The media guidance application may also replace the SD portion of "Movie A" with an HD portion of "Movie A" at a later time.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which:

FIG. 1 is an illustrative media guidance application screen showing media assets available for download, in accordance with some embodiments of this disclosure;

FIG. 13 is an exemplary process for receiving a first and second portion of a media asset, in accordance with some embodiments of this disclosure.

DETAILED DISCLOSURE

Figure 2:
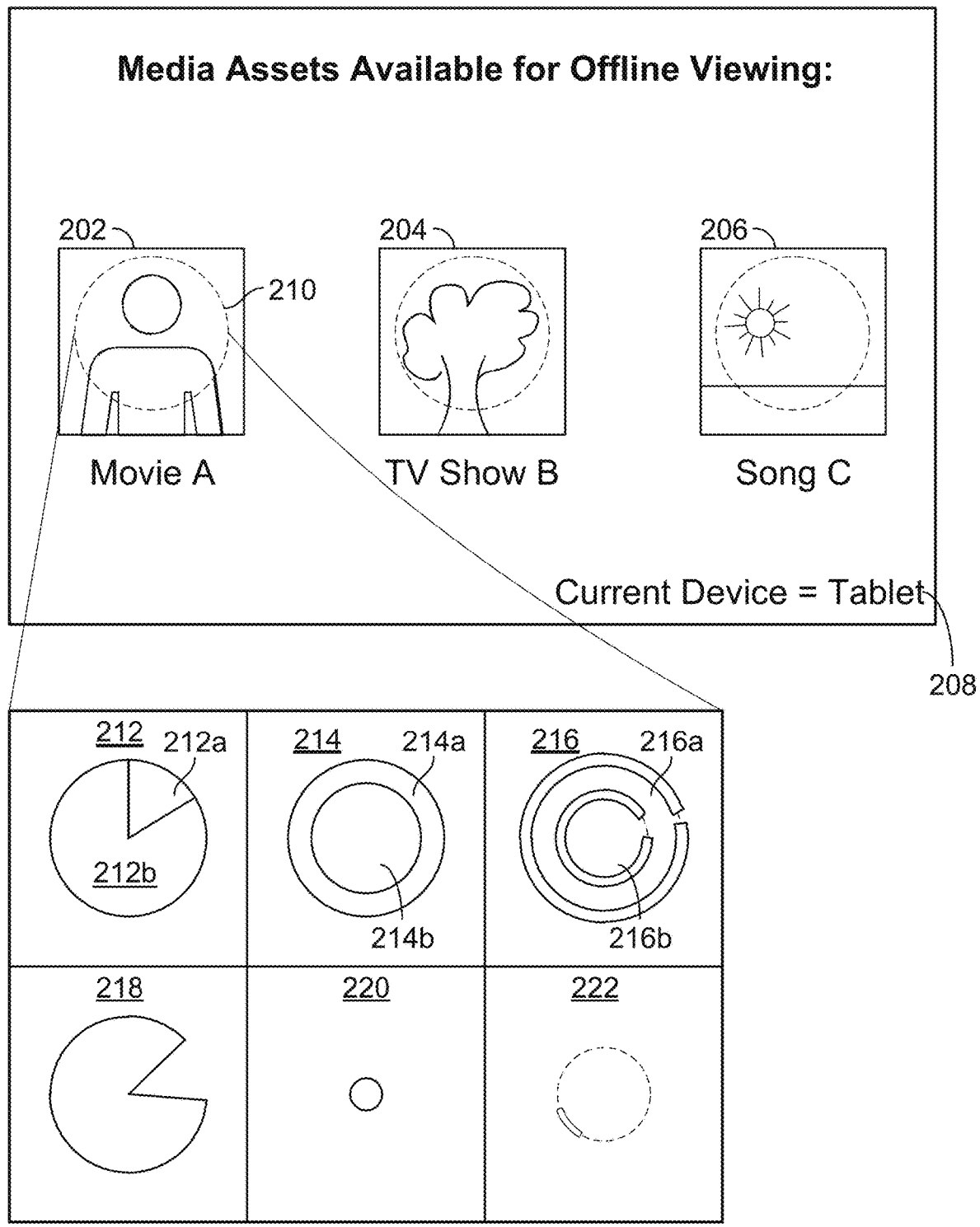
FIG. 2 is an illustrative media guidance application screen showing media assets that have been downloaded, in accordance with some embodiments of this disclosure.

Methods and systems may be required for downloading media assets efficiently and quickly before loss of network connectivity. For example, the media guidance application may determine a user has to board a flight in five minutes, and receive a user request to download a movie. The media guidance application may download the movie in segments, wherein 75% of the segments are downloaded in SD quality, which downloads faster than HD quality, and the remaining 25% of the segments are downloaded in HD quality. This may allow the download to be completed before the user boards his flight and loses network connectivity.

FIG. 1 is an illustrative media guidance application screen 100 showing media assets available for download incorporating embodiments of the present disclosure. Screen 100 depicts only three media assets for simplicity, but any number of media assets may be displayed as being available for download in accordance with the embodiments in this disclosure. Screen 100 may be displayed on any of user television equipment 602, user computer equipment 604, and wireless user communications device 606.

Screen 100 may show media assets available for download. While media assets have not been downloaded, they may only be available for viewing while communications network 614 is available. Once media assets have been downloaded, they may be available for viewing even if communications network 614 is not available. For example, media assets may require access to a cable television network or Internet to be viewed while they have not been downloaded.

Screen 100 may show icons for many different types of media assets that are available for download. The media guidance application may generate for display screen 100 using control circuitry 504 on display 512. For example, movie A 102, television show B 104, and song C 106 may be available for download and represented by their respective icons. Icons for movie A 102, television show B 104, and song C 106 may be of any shape or size, and may include any combination of text, images, and audio. In some embodiments, movie A 102, television show B 104, and song C 106 are media assets that have been downloaded by a user device, such as a set-top box. The media assets may be available for download on another connected user device, such as a tablet. In some embodiments, movie A 102, television show B 104, and song C 106 are media assets that are video-on-demand media assets. The media assets may be available for download on any user device to be viewed after the download.

Movie A 102, television show B 104, and song C 106 may be selectable by a user through a user input interface 510. The media guidance application may allow any number of media assets to be selected by the user.

Indicator 108 may include an identifier or name of the user device displaying screen 100. The media guidance application may connect the user device identified by indicator 108 to other user devices using communications network 614. For example, a tablet may be connected to a set-top box using the Internet. Indicator 108 may include any combination of text, images, and audio.

In some embodiments, the media guidance application may receive a selection of both movie A 102 and television show B 104, indicating the user would like to download both. The media guidance application may determine that the current device is a tablet, and retrieve information from storage circuitry 508 that tablets are used to view movies more often than television shows. The information in the storage circuitry 508 may list the frequency of viewing different types of media on different types of user devices. Based on the retrieved information, the media guidance application may schedule movie A 102 for download before television show B 104. This download order may be stored using storage circuitry 508.

FIG. 2 is an illustrative media guidance application screen 200 showing media assets that have been downloaded incorporating embodiments of the present disclosure. The media guidance application may generate for display screen 200 once the media assets shown in screen 100 have been downloaded fully or partially. The media guidance application may receive user input through user input interface 510 that the media assets should be downloaded before it generates for display screen 200.

The media guidance application may generate for display icons for movie A 202, television show B 204, and song C 206 in a similar manner to the icons generated for display for movie A 102, television show B 104, and song C 106. The media guidance application may generate for display indicator 208 in a similar manner to indicator 108.

The media guidance application may also generate for display partially transparent or opaque icons like icon 210 on top of the icon for each media asset. Icon 210 may indicate what portion of movie A 202 has been downloaded. Icon 210 may also indicate in which version movie A 202 has been downloaded. As referred to herein, "version" may refer to video quality (such as HD, SD, and 4K quality), sound quality (such as mono or stereo sound), or length of media asset (such as extended edition length and director's cut length).

The media guidance application may use any of icons 212-222 to represent the information shown by icon 210. Icons 212-222 are shown as exemplary icons, and any other icons may be used in accordance with embodiments of this disclosure. In some embodiments, the media guidance application chooses which of icons 212-222 to display based on user input. In some embodiments, the media guidance application chooses which of icons 212-222 to display based on the type of media asset. For example, icon 212 may be displayed for television shows such as television show B 204, and icon 214 may be displayed for songs such as song C 206. In some embodiments, icons 212, 214, and 216 are used for media assets which have been downloaded in multiple versions, while icons 218, 220, and 222 are used to media assets that have only been downloaded in a single version.

For example, the media guidance application may use icon 212 to indicate what portion of a media asset has been downloaded in a first version such as HD quality and what portion has been downloaded in a second version such as SD quality. Icon 212 may be similar to a pie graph. Portion 212a of the pie graph in icon 212 may indicate what portion of the media asset has been downloaded in HD quality while portion 212b may indicate what portion of the media asset has been downloaded in SD quality. For example, if 25% of movie A 202 has been downloaded in HD quality, portion 212a may comprise one-fourth of the area of the pie graph in icon 212. Similarly, if 75% of movie A 202 has been downloaded in SD quality, portion 212b may comprise three-fourths of the area of the pie graph in icon 212. Each portion may be associated with its own color and/or pattern. Additional portions may be added to the pie graph in icon 212 to indicate what portion of the media asset has been downloaded in 4K quality, or in other versions. Icon 218 may also be a pie graph, and may show what portion of the media asset has been loaded in a first version. For example, if 75% of movie A 202 has been downloaded in SD quality, and the rest of the download is incomplete, the pie graph in icon 218 may be three-fourths filled in.

Similarly, the media guidance application may use icon 214 to indicate what portion of a media asset has been downloaded in a first version and what portion has been downloaded in a second version. Icon 214 may use length of radii of concentric circles to represent the respective portions. The length of the radius of circle 214a may indicate what portion of the media asset has been downloaded in HD quality while the length of the radius of circle 214b may indicate what portion of the media asset has been downloaded in SD quality. For example, a radius of 300 pixels for icon 214 may indicate a complete download. If two-thirds of movie A 202 has been downloaded in SD quality, radius of circle 214b may be 200 pixels. If one-third of movie A 202 has been downloaded in HD quality, radius of circle 214a may be 100 pixels. Hence, the ratio of the radii of concentric circles 214a and 214b is proportional to the ratio of the portions of a movie downloaded in a first and second version. Each concentric circle may be associated with its own color and/or pattern. An additional circle may be added to icon 214 to indicate what portions of the media asset have been downloaded in 4K quality. Icon 220 may be similar, and the length of the radius of the circle in icon 220 may indicate what portion of the media asset has been downloaded in a first version. For example, a radius of 300 pixels for icon 220 may indicate a complete download. If half of movie A 202 has been downloaded in SD quality, and the rest of the download is pending, the radius of the circle in icon 220 may be 150 pixels.

Similarly, media guidance application may use icon 216 to indicate what portion of a media asset has been downloaded in a first version and what portion has been downloaded in a second version. Icon 214 may use length of circumference that is filled in for hollow concentric circles to represent the respective portions. The length of the circumference that is filled in for hollow concentric circle 216a may indicate what portion of the media asset has been downloaded in HD quality while the length of the circumference that is filled in for hollow concentric circle 216b may indicate what portion of the media asset has been downloaded in SD quality. A filled-in circumference length may be thicker and/or in a different color than an empty circumference length. For example, a completely filled-in circumference for hollow concentric circle 216a may indicate entire movie A 202 has been downloaded in HD quality. Similarly, a completely filled-in circumference for hollow concentric circle 216b may indicate entire movie A 202 has been downloaded in SD quality. If two-thirds of movie A 202 has been downloaded in SD quality, two-thirds of the circumference of hollow concentric circle 216a may be filled in. If one-third of movie A 202 has been downloaded in HD quality, one-third of the circumference of hollow concentric circle 216b may be filled in. Hence, the ratio of the length of filled in circumference to the length of empty circumference for each hollow concentric circle 216a and 216b is proportional to the ratio of the portions of a movie downloaded in a first and second version. Each hollow concentric circle's filled-in and empty circumference lengths may be associated with their own color and/or pattern. An additional circle may be added to icon 216 to indicate what portions of the media asset have been downloaded in 4K quality. Icon 222 may indicate what portion of the media asset has been downloaded in a first version using the length of the circumference that is filled in for the circle.

In some embodiments, icon 210 may be animated while a media asset download is occurring. For example, if movie A 202 is currently being downloaded, the media guidance application may generate for display a spinning, flashing, or otherwise animated icon 210. The portions of each icon may be animated separately. For example, the media guidance application may apply a first animation such as flashing to portion 212a of icon 212 and a second animation such as sparkling to portion 212b of icon 212. In some embodiments, icon 210 may be static when a download is not occurring. For example, if the media guidance application has lost access to communications network 614 and movie A 202 is not currently being downloaded, the media guidance application may generate for display a still, non-animated icon 210.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front-facing screen and a rear-facing screen, multiple front screens, or multiple angled screens. In some embodiments, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
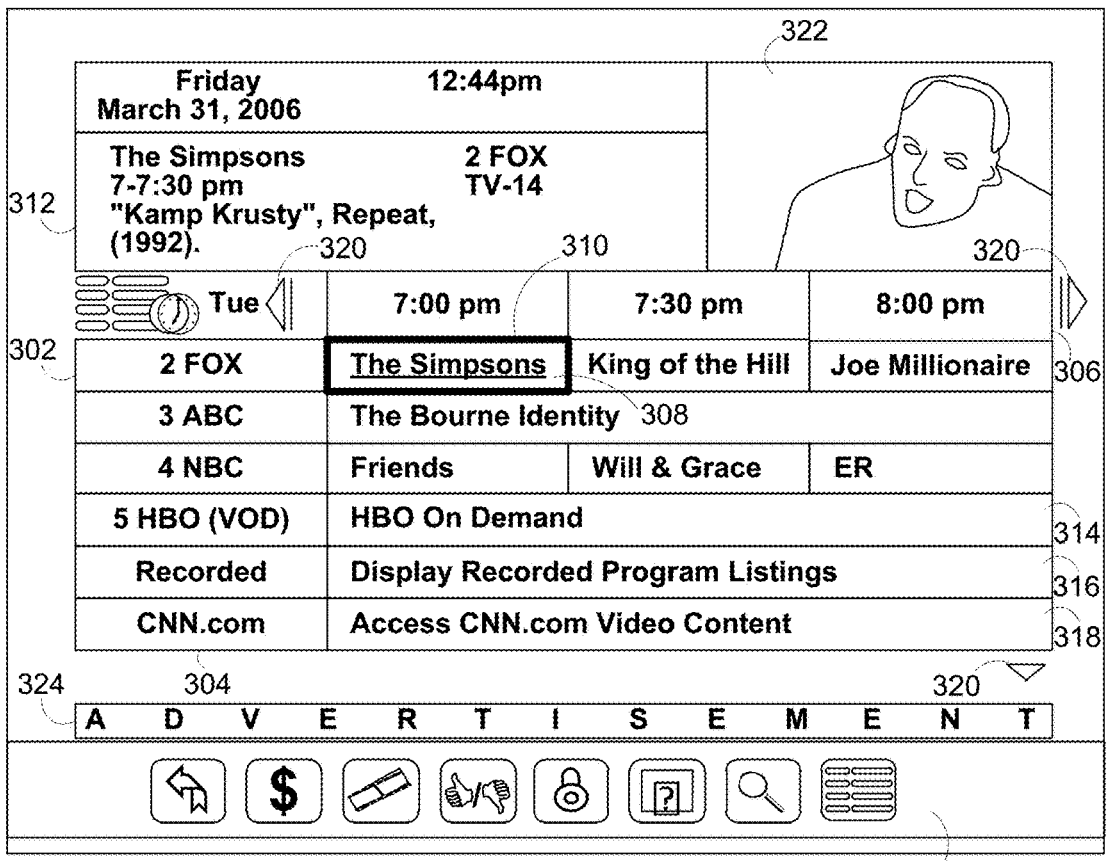
FIG. 3 shows an illustrative example of a display screen generated by a media guidance application, in accordance with some embodiments of the disclosure.
Figure 4:
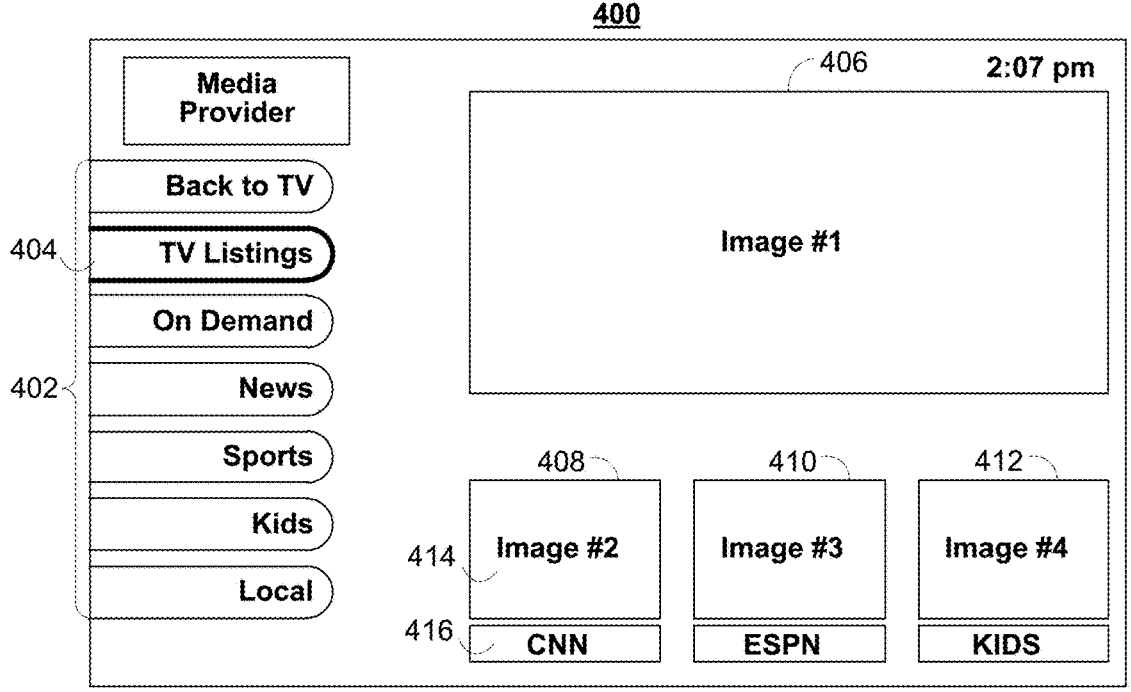
FIG. 4 shows another illustrative example of a display screen generated by a media guidance application, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows an illustrative grid of a program listings display 300 arranged by time and channel that also enables access to different types of content in a single display. Display 300 may include grid 302 with (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and not provided according to a schedule). Non-linear programming may include content from different content sources, including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003, and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in fullscreen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
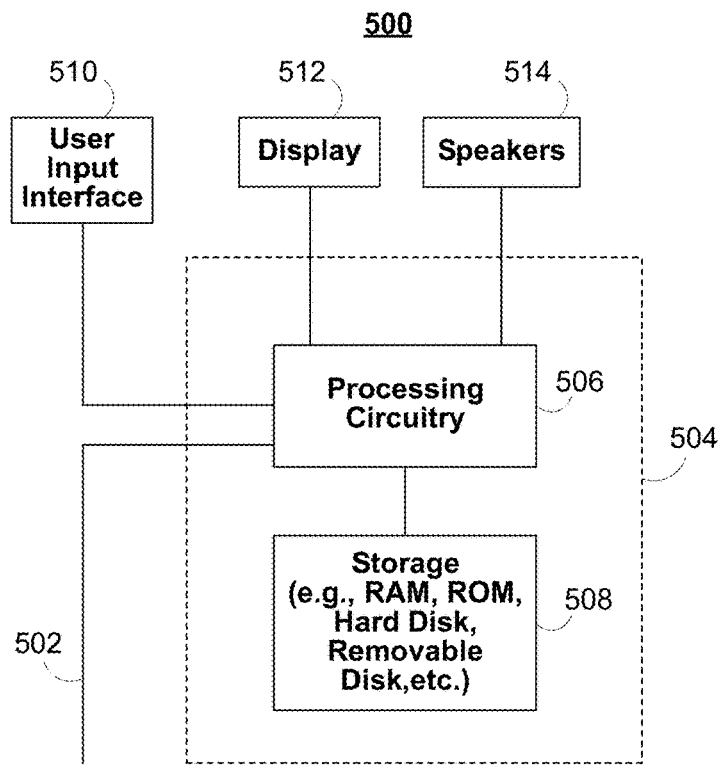
FIG. 5 is a block diagram of an illustrative user equipment device, in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein, as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature polysilicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
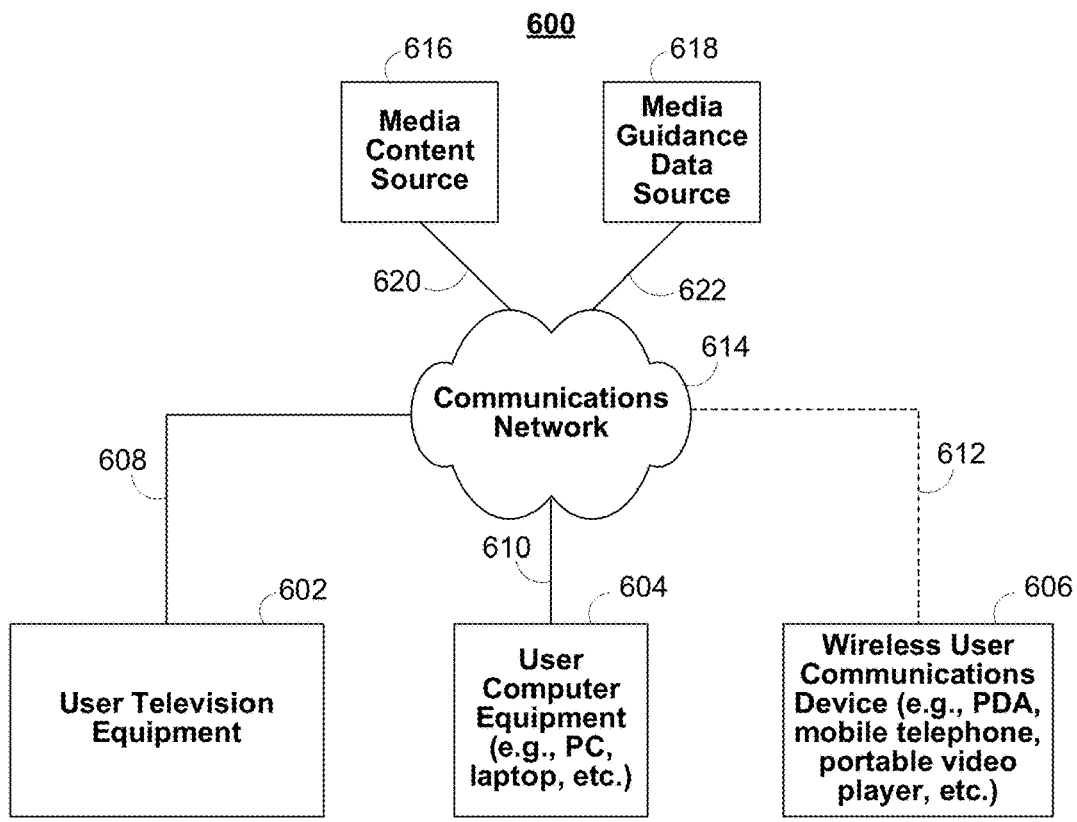
FIG. 6 is a block diagram of an illustrative media system, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a website accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and for displaying preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may, separately or together, include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that, in the exemplary embodiment shown in FIG. 6, it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and for providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify which sources or services a given user subscribes to and/or which sources or services the given user has previously subscribed to but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates the likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one which the user will likely terminate access to.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or a portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating where the user equipment devices are in locations remote from each other are discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
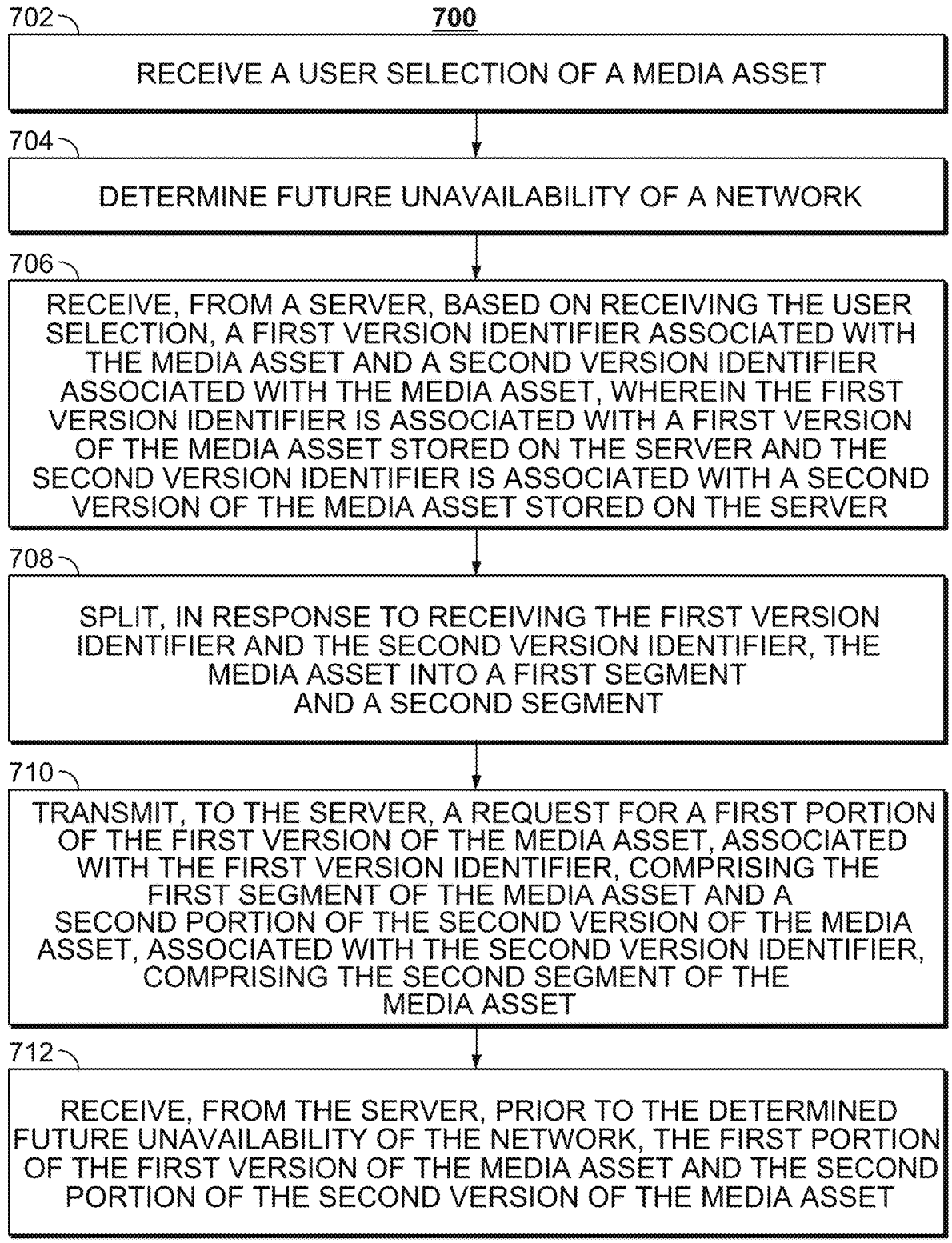
FIG. 7 is an exemplary process for efficiently downloading media assets, in accordance with some embodiments of this disclosure.

FIG. 7 is an exemplary process 700 for efficiently downloading media assets incorporating embodiments of the present disclosure. The media guidance application may execute process 700 using control circuitry 504 to download media assets shown on screens 100 and 200.

At block 702, the media guidance application, using control circuitry 504, receives a user selection of a media asset. Control circuitry 504 may receive a user selection of any of the media assets shown on screen 100 using user input interface 510. Control circuitry 504 may receive the user selection as described in relation to FIG. 8.

At block 704, the media guidance application, using control circuitry 504, determines future unavailability of a network. For example, the media guidance application may determine Internet will be unavailable if the user's calendar indicates the user will be boarding a flight soon. In another example, the media guidance application may determine cable signals are likely to be unavailable if the user's location is in the path of a severe storm. The media guidance application may determine the future unavailability as described in relation to FIG. 9.

The media guidance application may download media assets in a version that is quicker to download if the network is forecasted to be unavailable. For example, if the media guidance application receives a user request to download a movie and determines Internet will soon be unavailable, the media guidance application may download the movie in SD quality instead of HD quality since the former may be faster. This may allow more of the media asset to be downloaded before network connectivity is lost. The media guidance application may also allow users to view partially downloaded media assets. For example, if the media guidance application only downloads half a movie before the user loses network availability, the media guidance application may allow the user to view the half of the movie that has been downloaded.

At block 706, the media guidance application, using control circuitry 504, receives, from a server, based on receiving the user selection, a first version identifier associated with the media asset and a second version identifier associated with the media asset, wherein the first version identifier is associated with a first version of the media asset stored on the server and the second version identifier is associated with a second version of the media asset stored on the server. The media guidance application may receive the identifiers as described in relation to FIG. 10.

The server may be any of media content source 616 and media guidance data source 618. The server may store many different versions of the same media asset using storage circuitry 508. For example, the server may store SD and HD versions of movie A 102. The media guidance application may be able to use the received identifiers to request the different versions of the media asset from the server.

At block 708, the media guidance application, using control circuitry 504, splits, in response to receiving the first version identifier and the second version identifier, the user selected media asset into a first segment and a second segment. The media guidance application may allow the user to view any of these segments even if the other has not been downloaded. The media guidance application may split the media asset into more than two segments in accordance with this disclosure. The media guidance application may split the media asset using the processes described in relation to FIGS. 11 and 12.

At block 710, the media guidance application, using control circuitry 504, transmits, to the server, a request for a first portion of the first version of the media asset, associated with the first version identifier, comprising the first segment of the media asset and a second portion of the second version of the media asset, associated with the second version identifier, comprising the second segment of the media asset. For example, the media guidance application may transmit a request for a first half hour of a movie in SD quality and a second half hour of a movie in HD quality. The server may be a source of video-on-demand or stored media assets.

At block 712, the media guidance application, using control circuitry 504, receives, from the server, prior to the determined future unavailability of the network, the first portion of the first version of the media asset and the second portion of the section version of the media asset. The media guidance application may receive the first and second portions using communications network 614. For example, the media guidance application may receive the requested first half hour of a movie in SD quality and the second half hour of a movie in HD quality. The media guidance application may receive the first and second portions simultaneously. The media guidance application may store the received first and second portions, and then transmit requests for further portions of the media asset. The media guidance application may execute blocks 710 and 712 as described in relation to FIG. 13.

Figure 8:
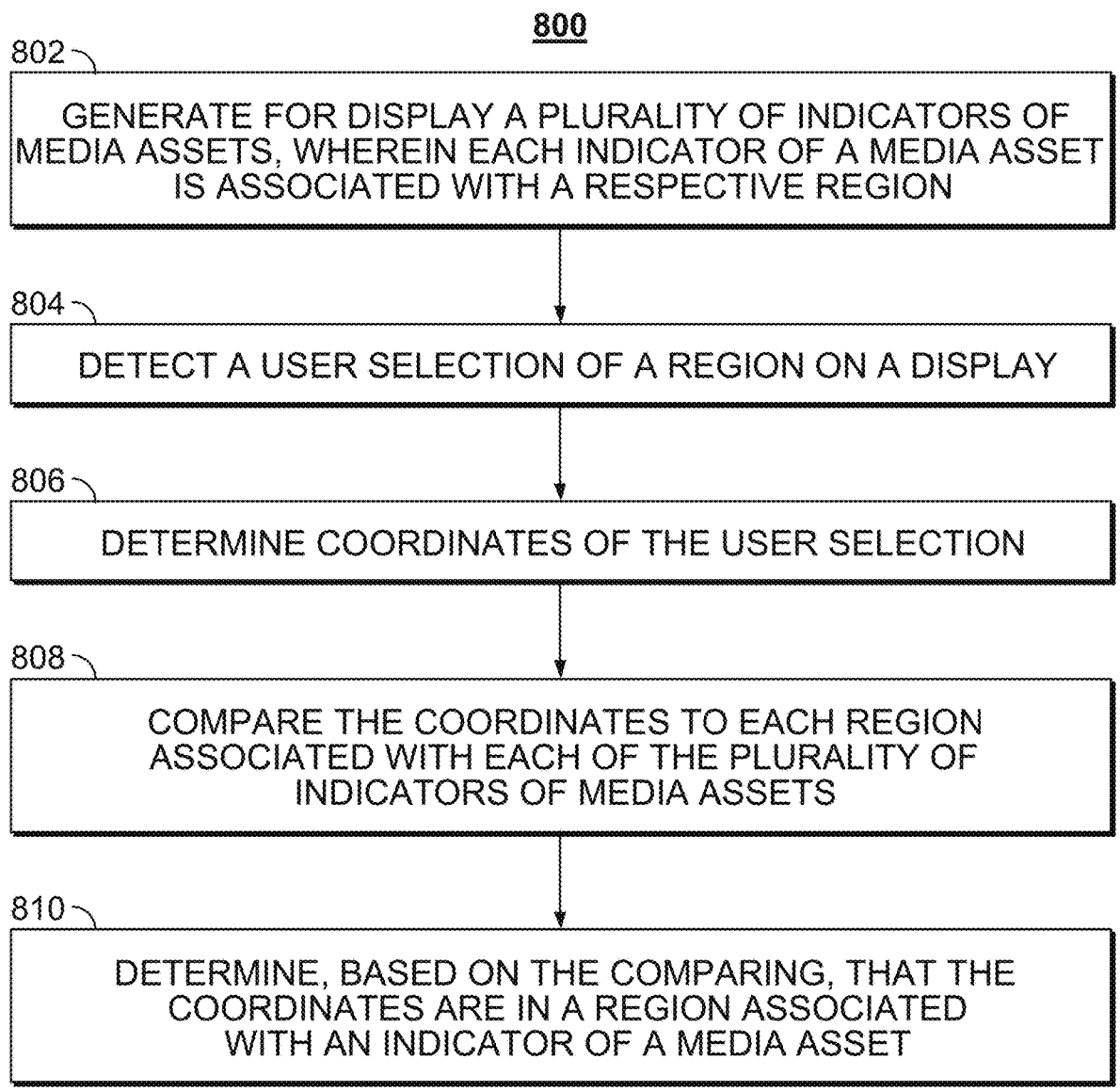
FIG. 8 is an exemplary process for receiving a user selection of a media asset, in accordance with some embodiments of this disclosure.

FIG. 8 is an exemplary process 800 for receiving a user selection of a media asset incorporating embodiments of this disclosure. Process 800 may be executed by control circuitry 504 to perform block 702. While the media guidance application may execute process 800 to receive selections on display 512, it is understood that the media guidance application may receive spoken selections from the user as well using speech-to-text software to interpret the user's spoken commands.

At block 802, the media guidance application, using control circuitry 504, generates for display a plurality of indicators of media assets, wherein each indicator of a media asset is associated with a respective region. For example, the media guidance application may generate for display screen 100 on display 512. The media guidance application may generate for display regions associated with each media asset indicator. For example, the media guidance application may generate for display screen 100 which includes indicators for movie A 102, television show B 104, and song C 106. Each indicator may be associated with an image region, as shown in screen 100.

At block 804, the media guidance application, using control circuitry 504, detects a user selection of a region on the display. The media guidance application may receive a user selection through user input interface 510. For example, the media guidance application may detect that the user touched a point on the surface of a touchscreen on a tablet displaying screen 100.

At block 806, the media guidance application, using control circuitry 504, determines coordinates of the user selection. For example, the media guidance application may determine that a user selected a pixel with (x, y) coordinates (200, 500) by activating a touchscreen of a tablet displaying screen 100.

At block 808, the media guidance application, using control circuitry 504, compares the coordinates to each region associated with each of the plurality of indicators of media assets. For example, the media guidance application may generate for display a selectable rectangular region for movie A 102 on screen 100 with (x, y) coordinates (100, 300) to (300, 700). The media guidance application may also generate for display a selectable rectangular region for television show B 104 on screen 100 with (x, y) coordinates (700, 300) to (900, 700). The media guidance application may compare the (x, y) coordinates of the user selection to the (x, y) coordinates of both these regions.

At block 810, the media guidance application, using control circuitry 504, determines, based on the comparing, that the coordinates are in a region associated with an indicator of a media asset. For example, the media guidance application may determine that the received user selection of coordinates (200, 500) belongs to the region associated with movie A 102 as described above.

Figure 9:
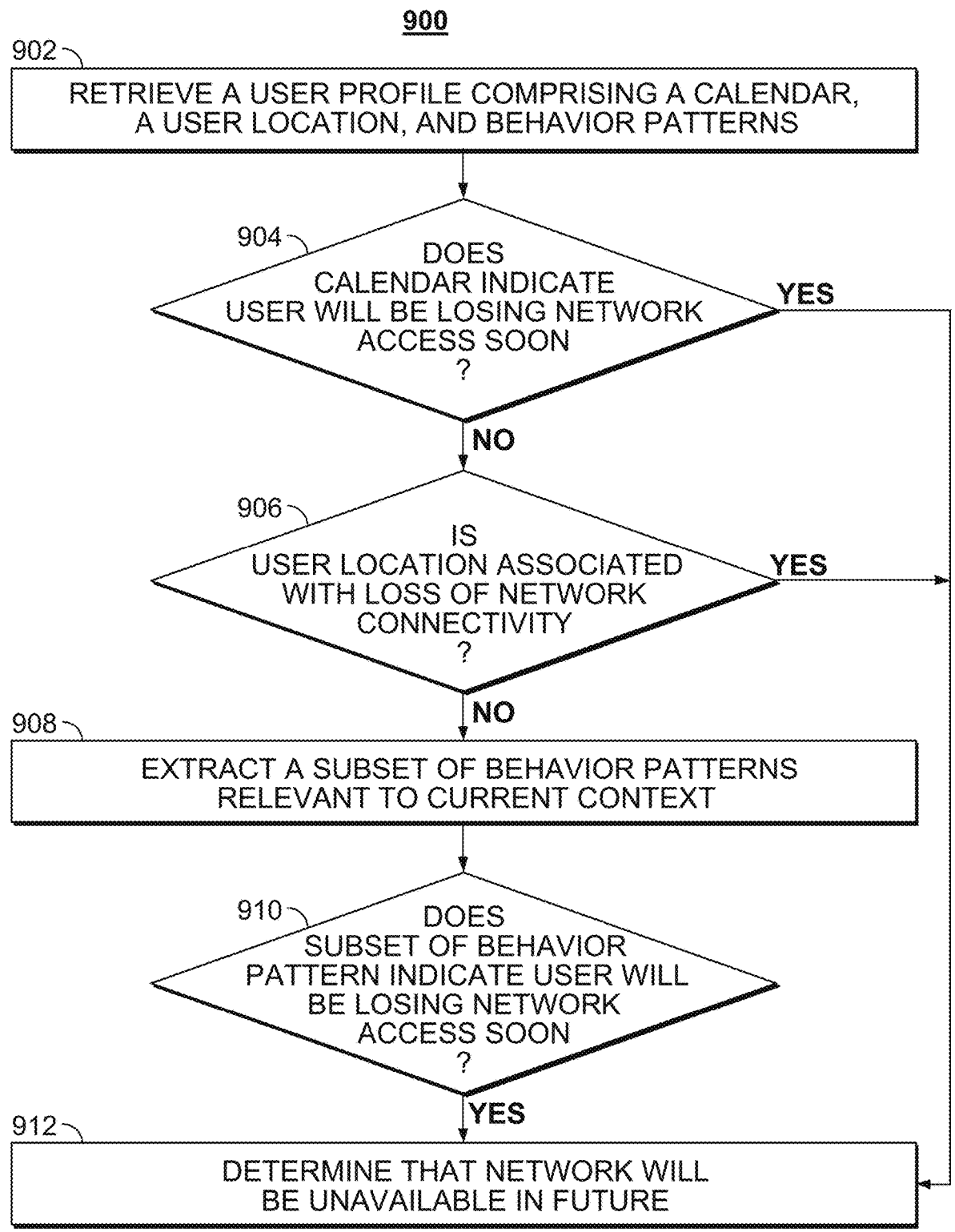
FIG. 9 is an exemplary process for determining future unavailability of a network, in accordance with some embodiments of this disclosure.

FIG. 9 is an exemplary process 900 for determining future unavailability of a network incorporating embodiments of this disclosure. The media guidance application may execute process 900 as part of block 704. As referred to herein, network access, network connectivity, and network availability are used interchangeably.

At block 902, the media guidance application, using control circuitry 504, retrieves a user profile comprising any combination of a calendar, a user location, and behavior patterns. The media guidance application may retrieve a local user profile from storage circuitry 508 or from a remote user profile database using communications network 614. The calendar may include records of past, present, and future user activities. For example, the calendar may include a record that the user has a flight booked for February 23 from 4:00 pm to 6:00 pm. The user location may be determined using GPS circuitry on the user device. For example, the media guidance application may be executed by control circuitry 504 on a tablet, and GPS circuitry on the same tablet may provide the user's current longitudinal and latitudinal coordinates. Behavior patterns may be determined by identifying common patterns in the user's periodic movements. For example, control circuitry 504 on a tablet may determine that a user's device loses network connectivity between 8:00 am and 9:00 am each morning, perhaps because the user is driving to work. In another example, control circuitry 504 on a tablet may determine that a user's device loses network connectivity every year around Christmas, perhaps because the user goes home to visit family.

At block 904, the media guidance application, using control circuitry 504, determines whether the calendar indicates the user will be losing network access soon. If the retrieved user profile has no calendar, process 900 may proceed to block 906. Control circuitry 504 may compare upcoming records in the calendar to a database of keywords that indicate network loss may occur. For example, the media guidance application may compare the calendar records to keywords such as "airport," "driving," and "subway" that have been stored in a database using storage circuitry 508. In some embodiments, the media guidance application will only compare a subset of calendar records within a certain threshold time of the current time (for example, calendar records within two hours of the current time) to the keywords. If records in the calendar match any of the keywords, the media guidance application may determine that the calendar indicates the user will be losing network access soon, and process 900 proceeds to block 912. The media guidance application may also store the time at which the user is expected to lose network access based on the information in the calendar record that shares a word with the keywords. Otherwise, process 900 proceeds to block 906.

At block 906, the media guidance application, using control circuitry 504, determines whether the user location is associated with loss of network connectivity. The media guidance application may determine the current user location by using coordinates provided by the GPS circuitry. The media guidance application may transmit, using communications network 614, these coordinates to a map on a server. The media guidance application may then receive a descriptor of a location associated with the location coordinates, such as "restaurant," "coffee shop," or "airport." Control circuitry 504 may compare the received descriptor to a database of keywords that indicate network loss may occur. The database of keywords may be the same as or different from the database of keywords used in block 904. For example, the media guidance application may compare a received descriptor "subway" to keywords such as "airport," "driving," and "subway" that have been stored in a database using storage circuitry 508. If a portion of the received descriptor matches any of the keywords, the media guidance application may determine the user location is associated with loss of network connectivity, and process 900 proceeds to block 912. Otherwise, process 900 proceeds to block 908. In some embodiments, process 900 proceeds to block 908 if no user location data is available in the user profile.

At block 908, the media guidance application, using control circuitry 504, extracts a subset of behavior patterns relevant to a current context. For example, the user profile retrieved by the media guidance application may include the following behavior patterns: loss of network connectivity on workdays between 8:00 am and 9:00 am (perhaps due to the user commuting to work) and loss of network connectivity every December (perhaps due to travelling home during holidays). The media guidance application may extract a subset of the behavior patterns that are applicable to a current context. For example, the media guidance application may determine the current day is a workday in November. Hence, the first behavior pattern is relevant to the current context, but the second is not. The media guidance application may extract the behavior pattern that indicates loss of network connectivity on workdays between 8:00 am and 9:00 am (perhaps due to the user commuting to work).

At block 910, the media guidance application, using control circuitry 504, determines whether the subset of behavior patterns indicates whether the user will be losing network access soon. The subset of behavior patterns may be the behaviors extracted in block 908, and each of the behavior patterns in the subset may be individually tested for the condition in block 910. For example, the media guidance application may have extracted a behavior pattern that indicates loss of network connectivity on workdays between 8:00 am and 9:00 am (perhaps due to the user commuting to work). The media guidance application may determine that the behavior pattern indicates the user will be losing network access soon if the current time is 7:55 am, and process 900 may proceed to block 912. The media guidance application may also store the time at which the user is expected to lose network access, as described below. The media guidance application may determine that the user will be losing network access soon if the current time is within a threshold amount of time (for example, ten minutes or 10% of the length of time of the behavior pattern) of a time associated with the behavior pattern. On the other hand, the media guidance application may determine that the behavior pattern indicates the user will not be losing network access soon if the current time is 9:05 am, and process 900 may be terminated. If no behavior patterns are available in the retrieved user profile, process 900 may also be terminated.

At block 912, the media guidance application, using control circuitry 504, determines that the network will be unavailable in the future. The media guidance application may store this determination using storage circuitry 508 to change the value of a Boolean variable "NetworkLossUpcoming" to "True". The media guidance application may also store, using storage circuitry 508, a time at which network loss is expected to occur, if that information can be extracted from the user profile. The media guidance application may also store the time at which the user is expected to lose network access. For example, if the media guidance application determined a calendar record starting at 7:00 pm indicated a loss of network connectivity at block 904, 7:00 pm may be stored. In another example, if the media guidance application determined a behavior pattern from 8:00 am to 9:00 am indicated loss of network connectivity at block 910, 8:00 am may be stored. If no time information is available, the media guidance application may store a predetermined default value, such as 30 minutes from the current time.

Figure 10:
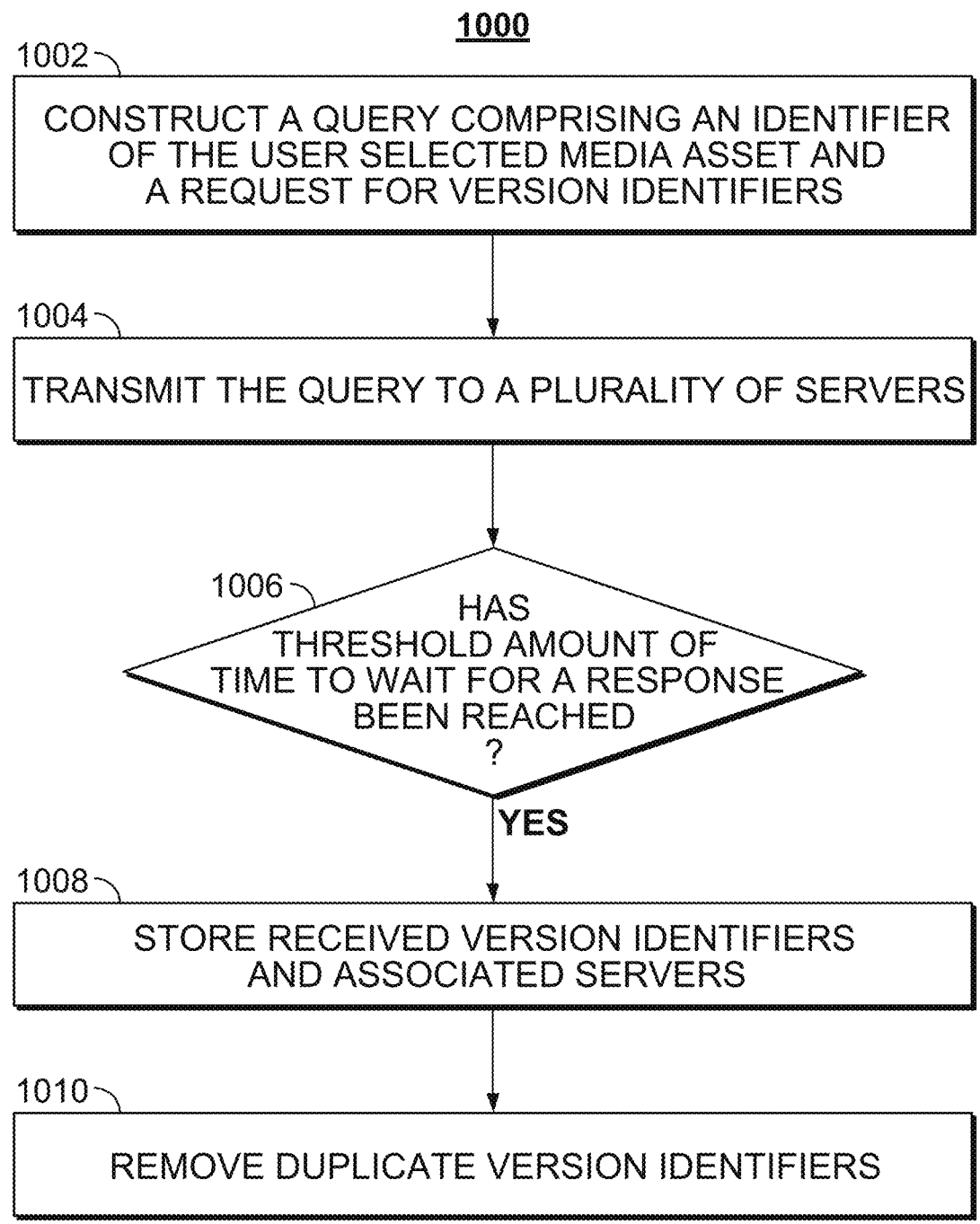
FIG. 10 is an exemplary process for receiving a first version identifier and a second version identifier from a network, in accordance with some embodiments of this disclosure.

FIG. 10 is an exemplary process 1000 for receiving a first version identifier and a second version identifier from a network incorporating embodiments of the present disclosure. The media guidance application may use the first and second version identifiers to learn of the existence and availability of the first and second versions of the media asset on any of the servers. The servers may be any of media content source 616 and media guidance data source 618. Control circuitry 504 may execute process 1000 as part of block 706.

At block 1002, the media guidance application, using control circuitry 504, constructs a query comprising an identifier of the user selected media asset and a request for version identifiers. For example, the media guidance application may construct a request for a media asset selected by the user in the following format—"MEDIA_ID='Movie A' AND MEDIA_VERSION='Any'". In some embodiments, the media guidance application only requests versions compatible with the user device being used to transmit the request. For example, the media guidance application may be using wireless user communications device 606 to transmit the request, wherein wireless user communications device 606 can only display videos of quality 360p and 480p on display 512. Hence, the media guidance application may construct the request in the following format—"MEDIA_ID='Movie A' AND (MEDIA_VERSION='360p' OR '480p')". The request formats shown here are exemplary, and any appropriate request formats may be used.

At block 1004, the media guidance application, using control circuitry 504, transmits the query constructed in block 1002 to a plurality of servers. The media guidance application may transmit the query using communications network 614. The plurality of servers may be media servers (such as media content source 616 and media guidance data source 618) that can provide media assets for download.

At block 1006, the media guidance application, using control circuitry 504, determines if a threshold amount of time to wait for a response has been reached. For example, the media guidance application may have a predetermined response wait time of 5 seconds. Control circuitry 504 may determine whether 5 seconds have been reached since the query was transmitted at block 1004. The time when the query was transmitted may be the time when the last query was transmitted to the last of the plurality of servers. If the threshold amount of time has not been reached, the media guidance application continues waiting for responses from the plurality of servers and caches any received responses using storage circuitry 508. If the threshold amount of time has been reached, process 1000 proceeds to block 1008.

At block 1008, the media guidance application, using control circuitry 504, stores received version identifiers and associated servers. All responses received during the response wait time period may have been cached by the media guidance application. The media guidance application may now store the received version identifiers and associated servers. For example, the media guidance application may have received a response from a server at block 1006 and cached the response. The media guidance application may now retrieve the response from the cache, extract the version identifiers and server identifier from the response, and store this information using storage circuitry 508. For example, the received and cached response may have been "TIME='1358' AND MEDIA_ID='Movie A' AND SERVER_ID='Movies Online Server 4' AND (VERSION_ID='360p' AND '480p') AND LOCATION='ALABAMA'". The media guidance application may store only the version identifiers (VERSION_ID='360p' AND '480p') and server identifier (SERVER_ID='Movies Online Server 4') for future use using storage circuitry 508. The media guidance application may discard the information stored in the cache after block 1008 has been executed for each received response.

At block 1010, the media guidance application, using control circuitry 504, removes duplicate version identifiers from the information stored during block 1008. For example, the media guidance application may have stored the following entries: [(SERVER_ID='Movies Online Server 4' AND (VERSION_ID='360p' and '480p')), (SERVER_ID='Movies Online Server 5' AND VERSION_ID='480p')]. In some embodiments, the media guidance application may remove duplicates to result in the maximum possible number of unique server identifiers remaining stored. Hence, the media guidance application may remove the duplicate version identifier '480p' from the stored entries as follows: [(SERVER_ID='Movies Online Server 4' AND VERSION_ID='360p'), (SERVER_ID='Movies Online Server 5' AND VERSION_ID='480p')]. In some embodiments, the media guidance application may sort the server identifiers (for example, alphabetically or in order of receipt of response) and remove the duplicates as they appear in the sorted entries. Hence, the media guidance application may remove the duplicate version identifier '480p' from the stored and alphabetically sorted entries as follows: [(SERVER_ID='Movies Online Server 4' AND (VERSION_ID='360p' AND '480p'))].

Figure 11:
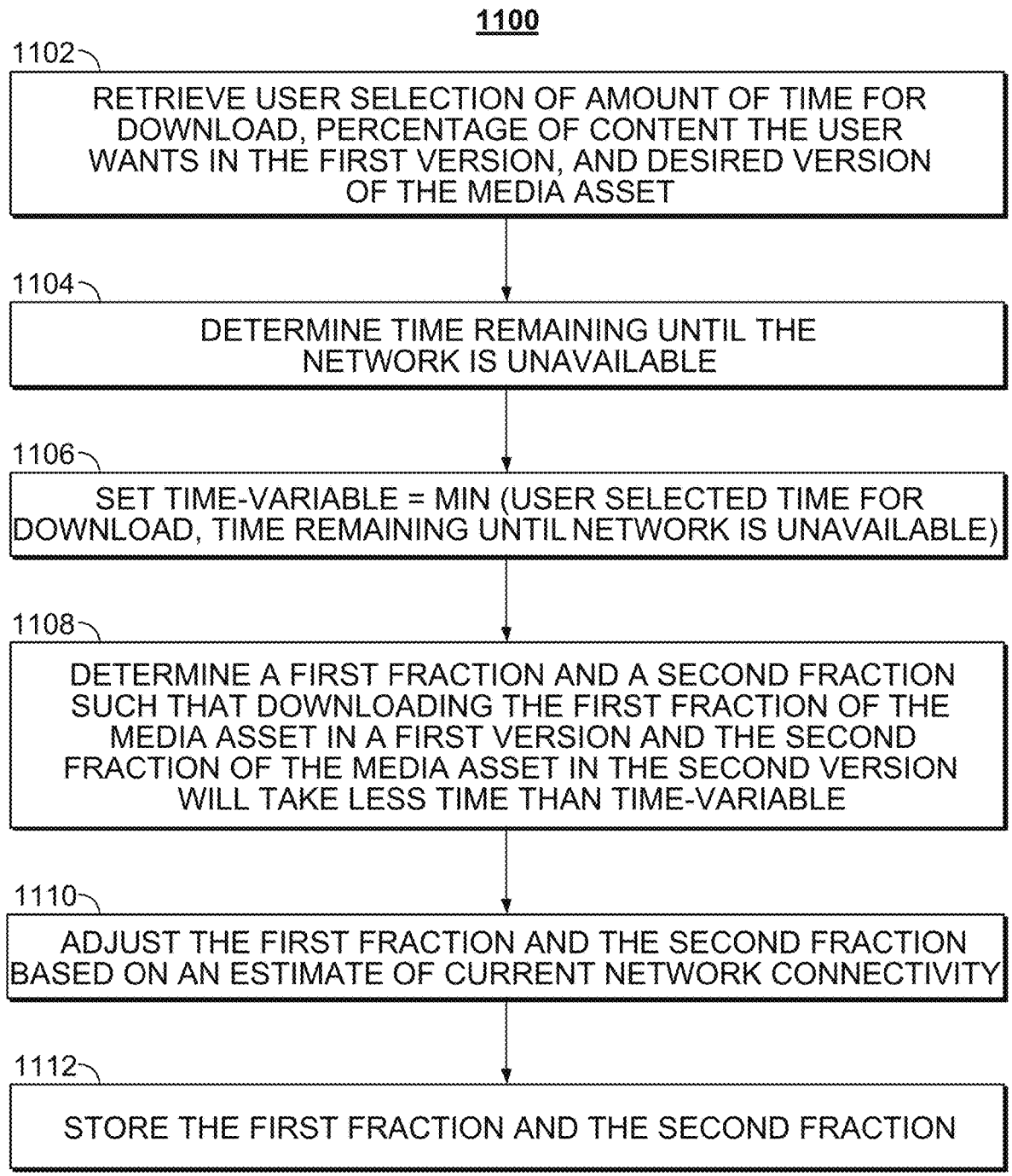
FIG. 11 is an exemplary process for determining what fraction of a media asset should be downloaded in a first version, in accordance with some embodiments of this disclosure.

FIG. 11 is an exemplary process 1100 for determining what fraction of a media asset should be downloaded in a first version incorporating embodiments of this disclosure. It is understood that process 1100 may be executed multiple times to determine what fraction of any media asset in a plurality of media assets should be downloaded in any version of a plurality of available versions. Control circuitry 504 may execute process 1100 as part of block 708.

At block 1102, the media guidance application, using control circuitry 504, retrieves some or all of a user selection of an amount of time for download, percentage of content the user wants in the first version, and desired version of the media asset. In some embodiments, the media guidance application may retrieve none of the user selections and use predetermined default values instead of retrieved selections for the following blocks. The information may be retrieved from the user profile described in relation to FIG. 9. The amount of time for download may specify a maximum time a user wants downloads of a media asset to take, such as one hour. An exemplary percentage of content the user wants in a first version may be 75% maximum of a movie in SD, rest in HD. A desired version of a media asset may be HD, whenever possible in light of the time and network availability constraints. The media guidance application may use the received user selections as constraints to be fulfilled. The media guidance application may break these constraints if needed to fully download a media asset, or to download as much of a media asset as can be downloaded before network connectivity is lost.

The media guidance application may have received this information through user input interface 510 and stored it using storage circuitry 508. The user may use user input interface 510 to select options on display 512. The user may be able to enter in the amount of time for download using a keyboard or a drop-down selection. The user may be able to enter the percentage of content the user wants in a first version using a slider bar or by entering in the number using a keyboard. The user may be able to enter the desired version of the media asset by selecting checkboxes for some or all of the available versions of media assets. In some embodiments, the user may speak his or her preferences into a microphone, and the media guidance application may use speech-to-text conversion to transcribe the user's speech and then extract the user selections from it.

At block 1104, the media guidance application, using control circuitry 504, determines time remaining until the network is unavailable. The media guidance application may retrieve the time stored during process 900 (for example, network connectivity is predicted to be lost at 8:00 am), determine a current time (for example, 7:45 am), and subtract the current time from the retrieved time to determine the time remaining (for example, fifteen minutes).

At block 1106, the media guidance application, using control circuitry 504, sets a local "time_variable" to equal the minimum of the user selected time for download, retrieved in block 1102, and the time remaining until the network is unavailable, determined in block 1104. The media guidance application may store "time_variable" using storage circuitry 508. For example, the media guidance application may determine the minimum of a user selected maximum download time of one hour and a time remaining until loss of network connectivity of fifteen minutes is fifteen minutes. The media guidance application may store "time_variable=00:15" using storage circuitry 508.

At block 1108, the media guidance application, using control circuitry 504, determines a first fraction and a second fraction such that downloading the first fraction of the media asset in a first version and the second fraction of the media asset in a second version will take less time than "time_variable". More than two fractions may be determined if more than two versions of the media asset will be downloaded. The two versions may be the versions received and stored in relation to FIG. 10. The media guidance application may determine the two fractions based on any combination of the following factors: available bandwidth on network, speed of downloading on network, size or length of media asset to be downloaded, "time_variable", the retrieved user selection of desired version, and/or the retrieved user selection of percentage of content the user wants in the first version. The media guidance application may use a predetermined default value for the available bandwidth or the download speed. The media guidance application may try to optimize and balance both speed of the download and quality of the downloaded version. For example, if the user selection indicated the user wants a maximum of 50% of the media asset in SD quality, and prefers to download HD quality, the media guidance application may determine 45% of movie A 102 needs to be downloaded in SD quality, 25% of movie A 102 can be downloaded in HD quality, and the remainder will not be able to be downloaded before network connectivity is lost in fifteen minutes. In another example, if the user selection indicated the user wants a maximum of 100% of the media asset in SD quality, the media guidance application may determine 100% of movie A 102 needs to be downloaded in SD quality and 0% in HD quality before network connectivity is lost in fifteen minutes. The fractions may be expressed as a fraction of the length of the media asset or a fraction of the size of the media asset.

At block 1110, the media guidance application, using control circuitry 504, adjusts the first fraction and the second fraction based on an estimate of current network connectivity. For example, the media guidance application may have used a predetermined default download speed of 5 MB/second when determining the first and second fraction at block 1108. Hence, the media guidance application may determine 45% of movie A 102 needs to be downloaded in SD quality, 25% of movie A 102 can be downloaded in HD quality, and the remainder will not be able to be downloaded before network connectivity is lost in fifteen minutes. However, the media guidance application may determine the current download speed is actually 6 MB/second. The media guidance application may determine the current download speed or available bandwidth by executing a test that uploads or downloads a test file using network 614 and measures the time taken to execute the test. The media guidance application may adjust the first and second fraction and determine that 50% of movie A 102 needs to be downloaded in SD quality, 30% of movie A 102 can be downloaded in HD quality, and the remainder will not be able to be downloaded before network connectivity is lost in fifteen minutes.

At block 1112, the media guidance application, using control circuitry 504, stores the first fraction and the second fraction using storage circuitry 508. For example, the media guidance application may determine in block 1110 that 50% of movie A 102 needs to be downloaded in SD quality and 30% of movie A 102 can be downloaded in HD quality. The media guidance application may store these fractions, using storage circuitry 508, in any of the following exemplary information formats: [HD=0.5, SD=0.3], [0.5, 0.3], [HD=50, SD=30], [50, 30], [HD=50, SD=30, NULL=20], and [50, 30, 20]. Any other similar formats to store the information may also be used.

Figure 12:
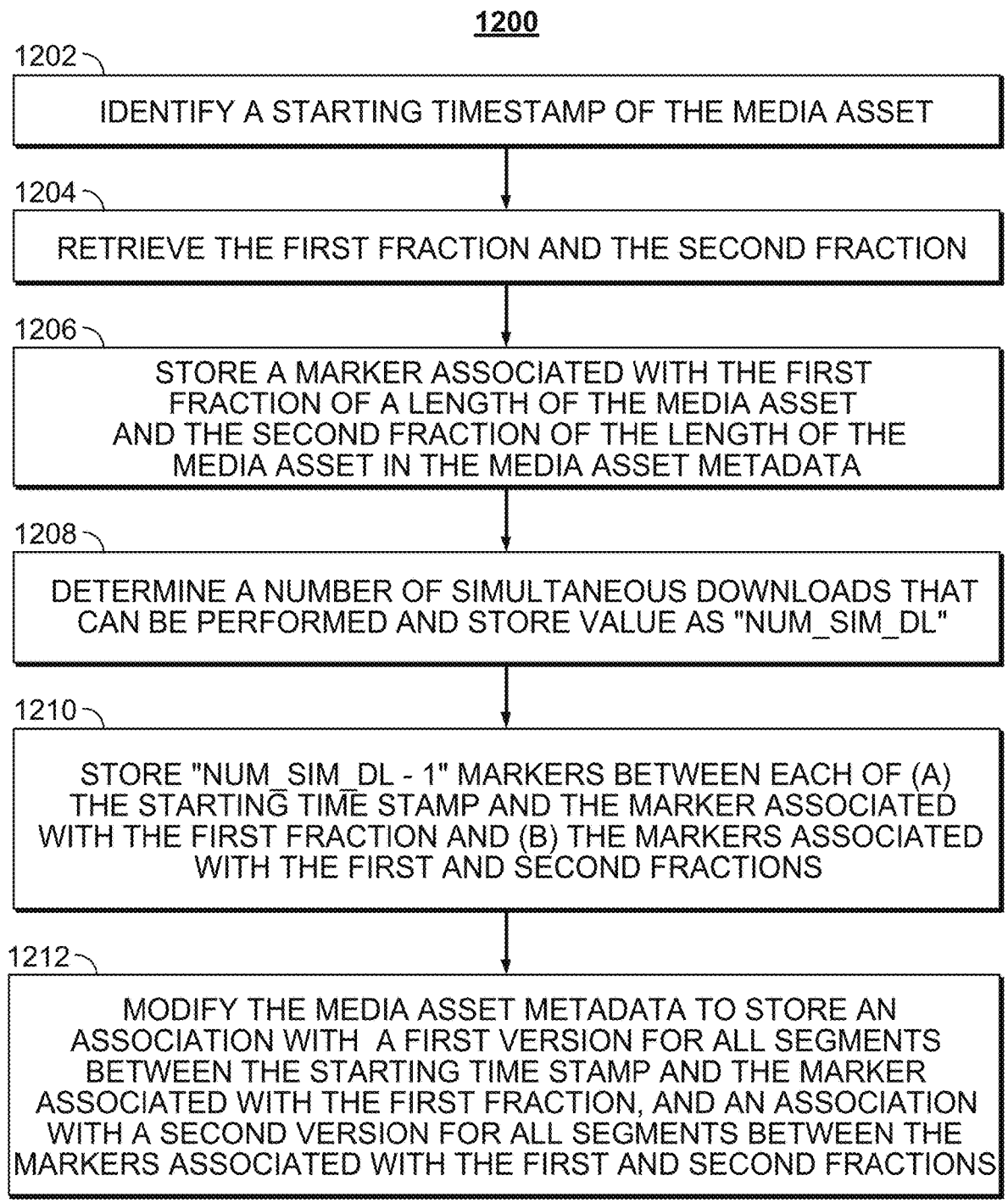
FIG. 12 is an exemplary process for splitting a media asset, in accordance with some embodiments of this disclosure.

FIG. 12 is an exemplary process 1200 for splitting a media asset incorporating embodiments of this disclosure. Control circuitry 504 may execute process 1100 as part of block 708. Although process 1200 is described as using two fractions, it is understood that any number of fractions may be used in accordance with this process.

At block 1202, the media guidance application, using control circuitry 504, may identify a starting timestamp of the media asset. The media guidance application may determine a default timestamp of 00:00 unless the media asset has already been partially viewed by the user or the user requested download of only a portion of the media asset. If the media asset has been partially viewed by the user, the media guidance application may determine the starting timestamp to have the same value as the latest bookmark in the media asset. If the user requested download of only a portion of the media asset, the media guidance application may determine the starting timestamp to be the first timestamp in the requested portion.

At block 1204, the media guidance application, using control circuitry 504, retrieves the first fraction and the second fraction using storage circuitry 504. The determination and storage of the first fraction and the second fraction are described in more detail in relation to FIG. 11.

At block 1206, the media guidance application, using control circuitry 504, stores a marker associated with the first fraction of a length of the media asset and the second fraction of the length of the media asset in the media asset metadata. For example, the media guidance application may determine the length from the starting timestamp to the end of a media asset is 20 minutes. The first fraction may be 0.5 and the second fraction may be 0.3. The media guidance application may store a marker indicating the first fraction of a length of the media asset (20 minutes*0.5=10 minutes) and a marker indicating the second fraction of the length of the media asset (20 minutes*0.3=6 minutes) in the media asset metadata in local storage using storage circuitry 508. In some embodiments, the media guidance application stores the sizes of the fractions, that is, 10 minutes and 6 minutes. In some embodiments, the media guidance application stores the points in the length of the media asset that mark the boundaries of the fractions, that is, 10 minutes and (10 minutes+6 minutes=) 16 minutes. This is because the media guidance application will download the media asset between timestamps of 0 minutes and 10 minutes in a first version, and between timestamps of 10 minutes and 16 minutes in a second version.

At block 1208, the media guidance application, using control circuitry 504, determines a number of simultaneous downloads that can be performed and stores the number as a variable "num_sim_dl" using storage circuitry 508. The media guidance application may determine this number based on capabilities of the current user device. The media guidance application may also determine how many of the available simultaneous download streams are already being used on the user device, and subtract this number from the total number available. For example, the media guidance application may determine that a user tablet running the media guidance application is capable of 10 simultaneous download streams, where 8 of the download streams are currently being used. Hence, the media guidance application may store "num_sim_dl=2" using storage circuitry 508.

At block 1210, the media guidance application, using control circuitry 504, stores "num_sim_dl−1" markers between each of (a) the starting timestamp and the marker associated with the first fraction and (b) the markers associated with the first and second timestamps. This may allow as many simultaneous segment to be downloaded as possible. For example, the media guidance application may be downloaded a media asset of 20 minutes of length, with a starting timestamp at 00:00, a timestamp for the first fraction at 10:00, and a timestamp for the second fraction at 16:00. The media guidance application may then store "num_sim_dl−1" timestamps between each of these timestamps. For example, the media guidance application may store "num_sim_dl−1" (=2−1=1) additional timestamps at between the starting timestamp of 00:00 and first fraction timestamp of 10:00 at 05:00 and between the first fraction timestamp of 10:00 and second fraction timestamp of 16:00 at 13:00.

At block 1212, the media guidance application, using control circuitry 504, modifies the media asset metadata to store an association with the first version for all segments between the starting timestamp and the marker associated with the first fraction, and an association with the second version for all segments between the markers associated with the first and second fractions. For example, the first and second version may be SD and HD versions respectively. As discussed above, the media guidance application may have stored timestamps in the media asset metadata at 00:00, 05:00, 10:00, 13:00, and 16:00. The media guidance application may store an association with SD quality for segments 00:00-05:00 and 05:00-10:00. The media guidance application may also store an association with HD quality for segments 10:00-13:00 and 13:00 and 16:00. The media guidance application may store the media asset metadata in local storage using storage circuitry 508.

FIG. 13 is an exemplary process 1300 for receiving a first and second portion of a media asset incorporating embodiments of this disclosure. Control circuitry 504 may execute process 1300 as part of blocks 710 and 712. Process 1300 is described in relation to a first segment of a first media asset, and it is understood the same process may be used to receive any segment of any media asset.

At block 1302, the media guidance application, using control circuitry 504, transmits, to the server, a request for a first portion of the first version of the media asset, associated with the first version identifier, comprising the first segment of the user selected media asset. The user selected media asset may be movie A 102 as shown on screen 100. As described in relation to FIG. 10, the first version identifier may be "SD". As discussed in relation to FIG. 12, the first segment may be a portion of a media asset between timestamps 00:00 and 05:00. The server may be any of media content source 616 and media guidance data source 618. The media guidance application may transmit, through communications network 614, to the server, an identifier of the user selected media asset, a request including the first version identifier, and the timestamps associated with the first portion. For example, an exemplary request may be: [MEDIA_ID="Movie A" AND VERSION_ID="SD" AND TIMESTAMP1="00:00" AND TIMESTAMP2="05:00"]. The media guidance application may transmit the request to the server associated with the version identifier as stored in block 1008.

At block 1304, the media guidance application, using control circuitry 504, receives the first portion of the first version of the media asset from a server. The media guidance application may receive the portion requested in block 1302. If the media guidance application does not receive the first portion within a threshold response time, the media guidance application may re-transmit the request or transmit a request to another server. At block 1306, the media guidance application, using control circuitry 504, stores, using storage circuitry 508, the first portion of the first version of the media asset, as received at block 1304.

At block 1308, the media guidance application, using control circuitry 504, links the first portion of the first version of the media asset to other portions of the media asset based on media asset metadata. For example, the media asset metadata may indicate that the media asset has a first segment from timestamps 00:00-05:00 and a second segment from timestamps 05:00-10:00. The media guidance application may link the received first portion, comprising the segment from 00:00-05:00, to a portion, received later or simultaneously, comprising the segment from 05:00-10:00. The media guidance application may link the received portions to allow the first received portion and the second received portion to be played consecutively when the user selects movie A 202 on screen 200. In some embodiments, the media guidance application will link partially downloaded portions to fully downloaded portions. For example, if a download of a portion of a media asset could not be finished before loss of network connectivity, the partially downloaded portion may be stored and linked to fully downloaded portions. The media guidance application may allow users to view media assets while they are being downloaded.

Once the first portion of the media asset has been downloaded, the media guidance application may remove the icon for the media asset (for example, movie A 102) from screen 100 and add the icons for the media asset (for example, movie A 202) to screen 200, and generate for display icon 210 overlaid on the icons for the media asset on screen 200. When each subsequent portion of the media asset is downloaded, the media guidance application may update icon 210. The updating may be based on the media guidance application determining what portion of the media asset has been downloaded in each version. Using the determination, the media guidance application may update icons 212 or 218 with new areas for the portions of the pie graph, icons 214 or 220 with new radii for the concentric circles, or icons 216 or 222 with new lengths of filled in circumferences for the hollow concentric circles.

Figure 14:
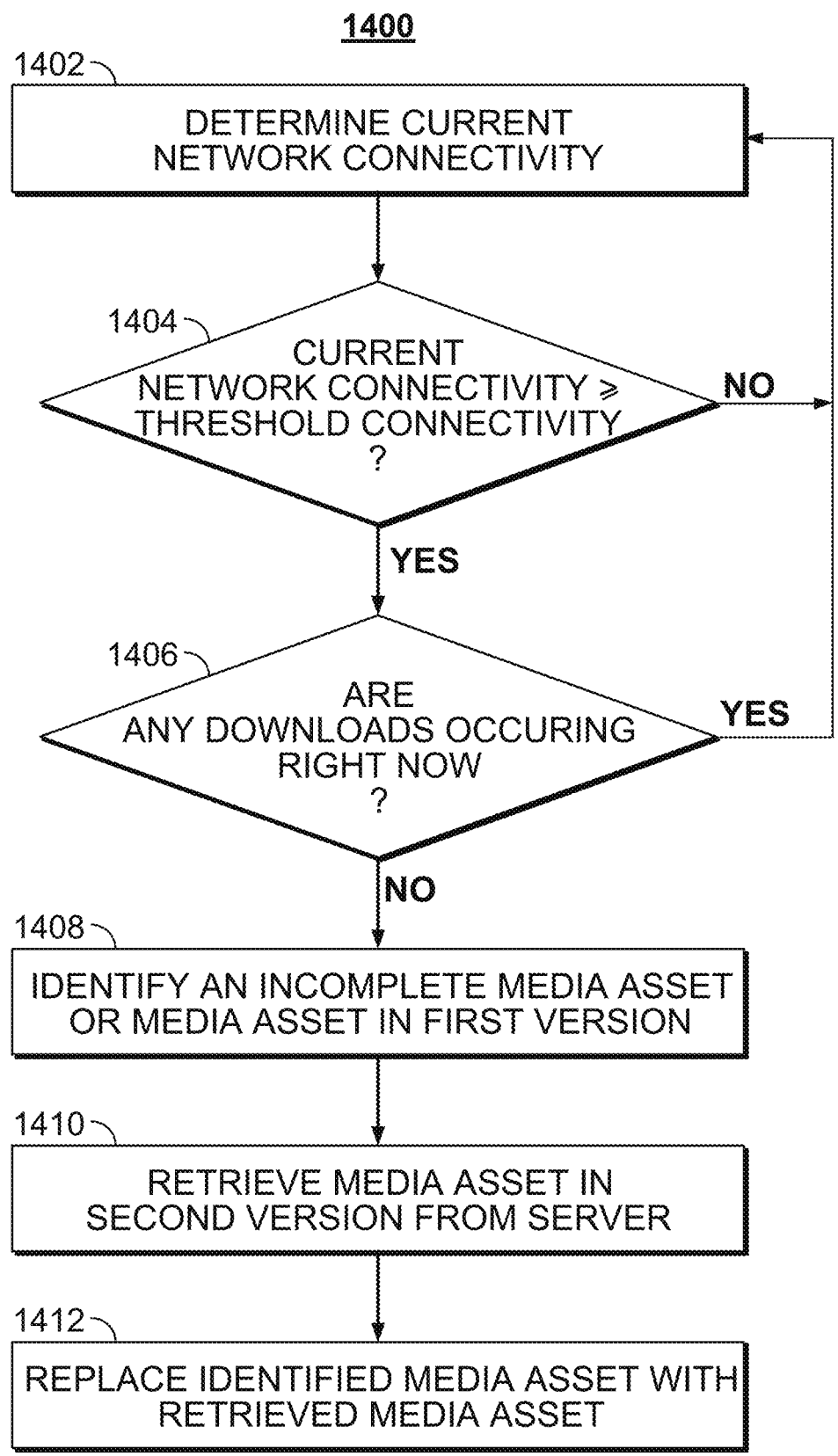
FIG. 14 is an exemplary process for replacing downloaded media assets, in accordance with some embodiments of this disclosure.

FIG. 14 is an exemplary process 1400 for replacing downloaded media assets incorporating embodiments of this disclosure. Control circuitry 504 may execute process 1400 to replace portions of a media asset downloaded in a lower quality version with a higher quality version. For example, a user selection, as received in block 1102, may indicate a user prefers media assets in "720p" quality. The media guidance application may have downloaded a media asset in "360p" quality to complete the download before network connectivity is lost. In some embodiments, the media guidance application will replace the "360p" portions with "480p" portions, and then replace the "480p" portions with "720p" portions. In some embodiments, the media guidance application will replace the "360p" portions with "720p" portions.

In some embodiments, portions at the beginning and end portions of a media asset may not be replaced with a higher quality version of the media asset since these portions are likely to contain credits, and hence may not be important to the user.

At block 1402, the media guidance application, using control circuitry 504, determines current network connectivity. The media guidance application may determine whether the user has regained network connectivity after the loss of network connectivity predicted in relation to FIG. 9. The media guidance application may determine whether communications network 614 can be accessed, and measure the quality of access. For example, the media guidance application may measure bandwidth, upload speeds, download speeds, or any other network quality statistic.

At block 1404, the media guidance application, using control circuitry 504, determines whether the current network connectivity, as determined at block 1402, is greater than or equal to a predetermined threshold connectivity. If the condition is true, process 1400 proceeds to block 1406. Otherwise, block 1400 returns to block 1402.

At block 1406, the media guidance application, using control circuitry 504, determines whether any downloads are currently occurring. If the media guidance application determines downloads are occurring right now, the media guidance application may allow those downloads to complete before beginning replacement of already downloaded media assets. The media guidance application may determine whether any downloads are currently occurring by checking the status of all possible simultaneous download streams for the current user device. If the media guidance application finds at least one download stream not being used, process 1400 proceeds to block 1408. Otherwise, process 1400 returns to block 1402.

At block 1408, the media guidance application, using control circuitry 504, identifies an incomplete media asset or media asset in the first version. If the media guidance application determines a media asset was not completely downloaded, the media guidance application may download the remaining portions of the incomplete media asset. If a media asset has portions in a lower quality first version, the media guidance application may replace the lower quality first version portions with higher quality second version portions. The media guidance application may identify a media asset with either the longest incomplete portion or longest portion in a lower quality first version.

At block 1410, the media guidance application, using control circuitry 504, retrieves the media asset in a higher quality second version from the server. In some embodiments, if the media guidance application identified an incomplete media asset at block 1408, the media guidance application may retrieve portions in lower quality first version from the server to complete the download of the incomplete media asset. The media guidance application may retrieve the media asset as described in relation to FIG. 13.

At block 1412, the media guidance application, using control circuitry 504, replaces the identified media asset with the retrieved media asset. The media guidance application may erase the lower quality first version portion of the media asset from storage circuitry 508 and replace the erased portion with the higher quality second version portion of the media asset. The media guidance application may also update the links in the media asset metadata to remove links to the lower quality first version portion and add links to the higher quality section version portion, as described in relation to block 1308. The media guidance application may also update icon 210.

In some embodiments, if the media guidance application identified an incomplete media asset at block 1408, the media guidance application may create links between the newly downloaded portion and the incomplete media asset as described in relation to block 1308.

It should be noted that processes 700-1400, or any step thereof could be performed on, or provided by, the optimization system on any of the devices shown in FIGS. 3-4. For example, processes 700-1400 may be executed by processing circuitry 504 (FIG. 3) as instructed by processing circuitry implemented on user equipment 602, 404, and/or 406 (FIG. 4) in order to provide information to a user. In addition, one or more steps of processes 700-1400 may be incorporated into or combined with one or more steps of any other process or embodiment.

It is contemplated that the steps or descriptions of FIGS. 7-14 may be used with any other embodiment of this disclosure. In addition, the steps and descriptions described in relation to FIGS. 7-14 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
receiving, via a computing device, a user selection of a media asset;
estimating a time of a future change to a condition of a communication network;
computing, based on the estimated time, a size of a first segment of a first version of the media asset and a size of a second segment of a second version of the media asset; and
obtaining, from a server via the communication network, prior to the estimated time, the first segment of the first version of the media asset and the second segment of the second version of the media asset,
wherein the computing comprises optimizing the size of the first segment of the first version of the media asset and the size of the second segment of the second version of the media asset to maximize a higher quality version from among the first version of the media asset and the second version of the media asset.

2. The method of claim 1, wherein the first version comprises any of standard definition quality, high-definition quality, 4K video quality, 240p video quality, 320p video quality, 480p video quality, 720p video quality, and 1080p video quality, and the second version comprises any of standard definition quality, high-definition quality, 4K video quality, 240p video quality, 320p video quality, 480p video quality, 720p video quality, and 1080p video quality and wherein the second version is lower quality than the first version.

3. The method of claim 1, wherein estimating the time of the future change to the condition of the communication network comprises retrieving a user profile comprising at least one of a calendar, a location, and a behavior pattern.

4. The method of claim 1, wherein the estimated time is a first estimated time, and further comprising:
estimating a second time of future change to the condition of the communication network;
computing, based on the estimated second time, a size of a third segment of a third version of the media asset; and
obtaining, from a server via the communication network, prior to the estimated second time the third segment of the third version of the media asset.

5. The method of claim 1, wherein the computing is based on the estimated time of the future change and a time remaining until the condition of the communication network.

6. The method of claim 1, wherein the computing comprises:
identifying a size of a plurality of versions of the media asset;
identifying a download speed;
calculating a maximum download based on the download speed, estimated time of the future change; and
determining based on the maximum download, the first size of a first segment of the first version of the media asset and the size of the second segment of the second version of the media asset.

7. The method of claim 1, further comprising accessing a user profile; and wherein the estimating the time of the future change to the condition of the communication network comprises identifying previous periods of unavailability of the network based on receiving user commands from the user associated with the user profile.

8. The method of claim 1, wherein the estimating the time of the future change to the condition of the communication network comprises degradation of the communication network.

9. The method of claim 1, wherein the estimating the time is a first time, and wherein the size of the first segment of the first version is a first size of the first segment, and the size of the second segment of the second version is a first size of the second segment, and further comprising:
estimating a second time of the future change to the condition of the communication network, wherein the second time is different than the first time; and
computing, based on the estimated second time, a second size of the first segment of the first version of the media asset and a second size of the second segment of the second version of the media asset; and obtaining, from a server via the communication network, prior to the estimated second time, the first segment of the first version of the media asset and the second segment of the second version of the media asset.

10. A system comprising:
communication circuitry configured for a communication network; and
control circuitry configured to:
receive, via a computing device, a user selection of a media asset;
estimate a time of a future change to a condition of a communication network;
compute, based on the estimated time, a size of a first segment of a first version of the media asset and a size of a second segment of a second version of the media asset; and
obtain, from a server via the communication network, prior to the estimated time, the first segment of the first version of the media asset and the second segment of the second version of the media asset,
wherein the control circuitry configured to compute comprises optimizing the size of the first segment of the first version of the media asset and the size of the second segment of the second version of the media asset to maximize a higher quality version from among the first version of the media asset and the second version of the media asset.

11. The system of claim 10, wherein the first version comprises any of standard definition quality, high-definition quality, 4K video quality, 240p video quality, 320p video quality, 480p video quality, 720p video quality, and 1080p video quality, and the second version comprises any of standard definition quality, high-definition quality, 4K video quality, 240p video quality, 320p video quality, 480p video quality, 720p video quality, and 1080p video quality and wherein the second version is lower quality than the first version.

12. The system of claim 10, wherein the control circuitry configured to estimate the time of the future change to the condition of the communication network comprises retrieving a user profile comprising at least one of a calendar, a location, and a behavior pattern.

13. The system of claim 10, wherein the estimated time is a first estimated time, and the control circuitry further configured to:
estimating a second time of future change to the condition of the communication network;
computing, based on the estimated second time, a size of a third segment of a third version of the media asset; and
obtaining, from a server via the communication network, prior to the estimated second time the third segment of the third version of the media asset.

14. The system of claim 10, wherein the computing is based on the estimated time of the future change and a time remaining until the condition of the communication network.

15. The system of claim 10, wherein the control circuitry further configured to compute comprises:
identify a size of a plurality of versions of the media asset;
identify a download speed;
calculate a maximum download based on the download speed, estimated time of the future change; and
determine based on the maximum download, the first size of a first segment of the first version of the media asset and the size of the second segment of the second version of the media asset.

16. The system of claim 10, the control circuitry further configured to access a user profile; and wherein the control circuitry to estimate the time of the future change to the condition of the communication network is configured to identify previous periods of unavailability of the network based on receiving user commands from the user associated with the user profile.

17. The system of claim 10, wherein the estimating the time of the future change to the condition of the communication network comprises degradation of the communication network.

18. The system of claim 10, wherein the estimating the time is a first time, and wherein the size of the first segment of the first version is a first size of the first segment, and the size of the second segment of the second version is a first size of the second segment, and the control circuitry further configured to:
   estimate a second time of the future change to the condition of the communication network, wherein the second time is different than the first time; and
   compute, based on the estimated second time, a second size of the first segment of the first version of the media asset and a second size of the second segment of the second version of the media asset; and obtaining, from a server via the communication network, prior to the estimated second time, the first segment of the first version of the media asset and the second segment of the second version of the media asset.

* * * * *